United States Patent [11] 3,555,319

[72] Inventor Edward J. Schaefer
 Bluffton, Ind.
[21] Appl. No. 804,533
[22] Filed Mar. 5, 1969
[45] Patented Jan. 12, 1971
[73] Assignee Franklin Electric Co., Inc.
 Bluffton, Ind.
 a corporation of Indiana

[54] SUBMERSIBLE ELECTRIC MOTOR
 21 Claims, 9 Drawing Figs.
[52] U.S. Cl. .................................................. 310/87,
 103/87, 310/68.3, 310/71
[51] Int. Cl. ........................................................ H02k 5/12
[50] Field of Search ........................................... 310/87, 71,
 68.3, 85, 86; 103/87

[56] References Cited
 UNITED STATES PATENTS
2,883,566 4/1959 Briggs........................... 310/87
3,255,367 6/1966 Schaefer....................... 310/87
3,010,401 11/1961 Granqvist..................... 310/68.3X
2,742,597 4/1956 Penlington................... 310/87X
3,457,867 7/1969 Komob......................... 310/87X
2,689,529 9/1954 Wightman.................... 310/87X
3,444,403 5/1969 Macha.......................... 310/87X
2,404,783 7/1946 Blom............................. 310/87UX
3,239,698 3/1966 Clark............................ 310/68.3X Primary Examiner—Milton O. Hirshfield
Assistant Examiner—B. A. Reynolds
Attorney—Hibben, Noyes and Bicknell ABSTRACT: This disclosure deals with a submersible electric motor including a connector member at one end thereof. The connector member is constructed to serve the multiple functions of an end section for the motor, connecting means between the motor and a pipe for suspending the motor, the connecting means further forming a liquid connection between the pipe and liquid passages formed in the motor, and an electrical connection between the motor winding and a power cable. The remainder of the motor may readily be disconnected from the connector member, for servicing or replacement, thereby automatically breaking the above connections.

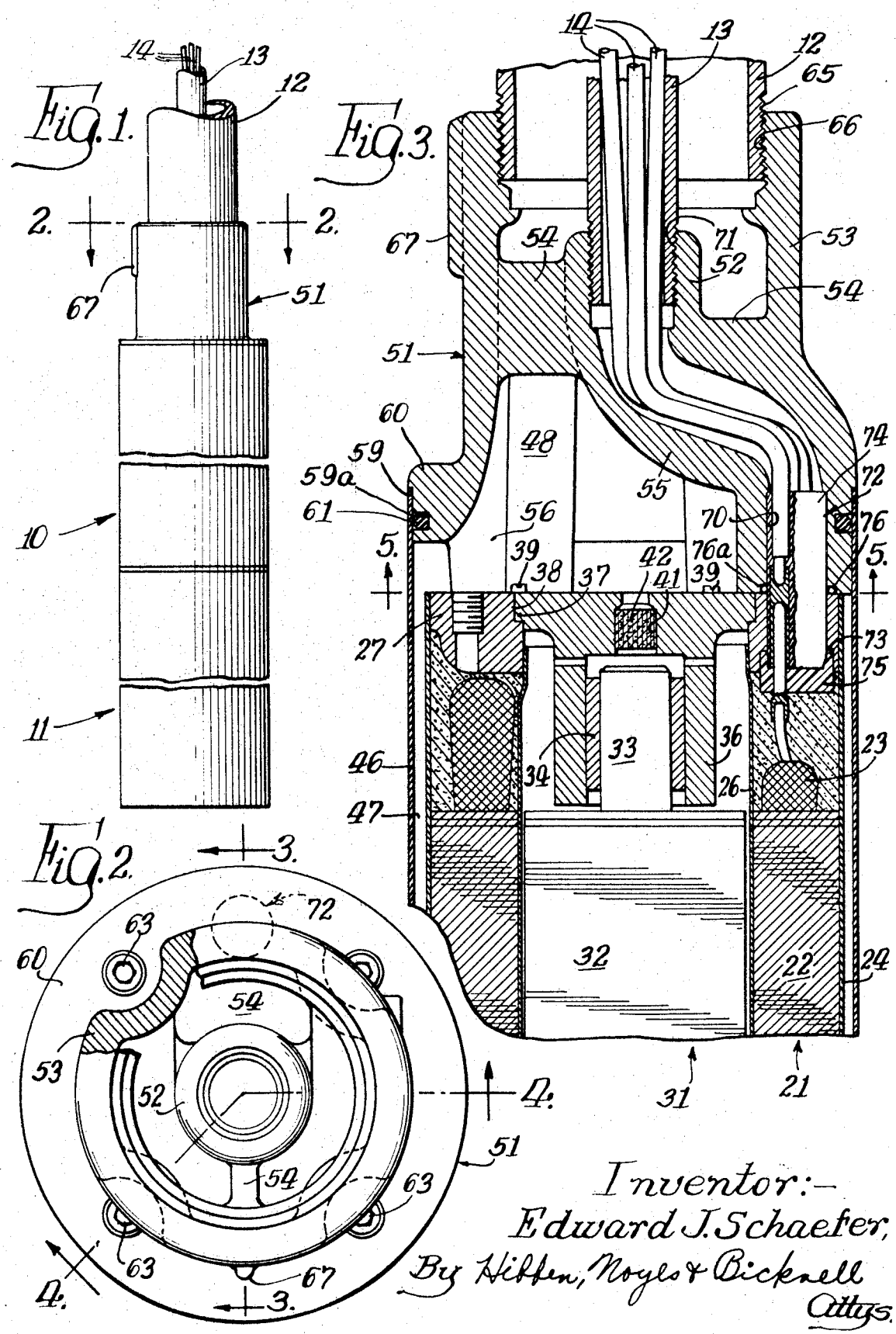

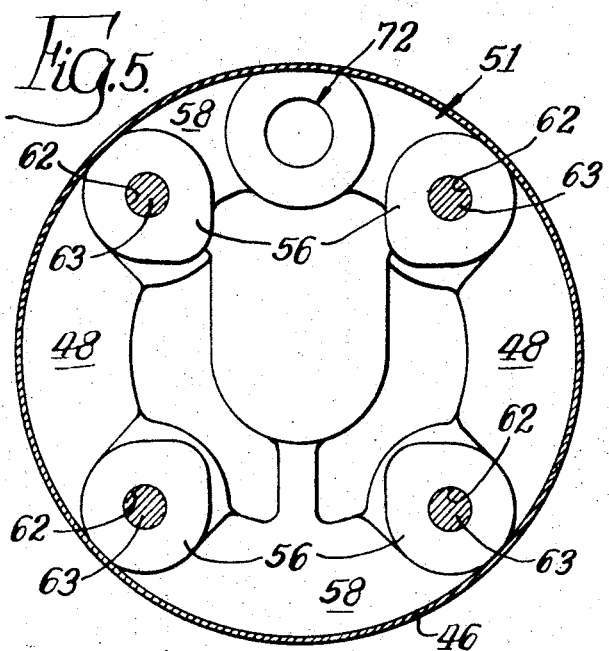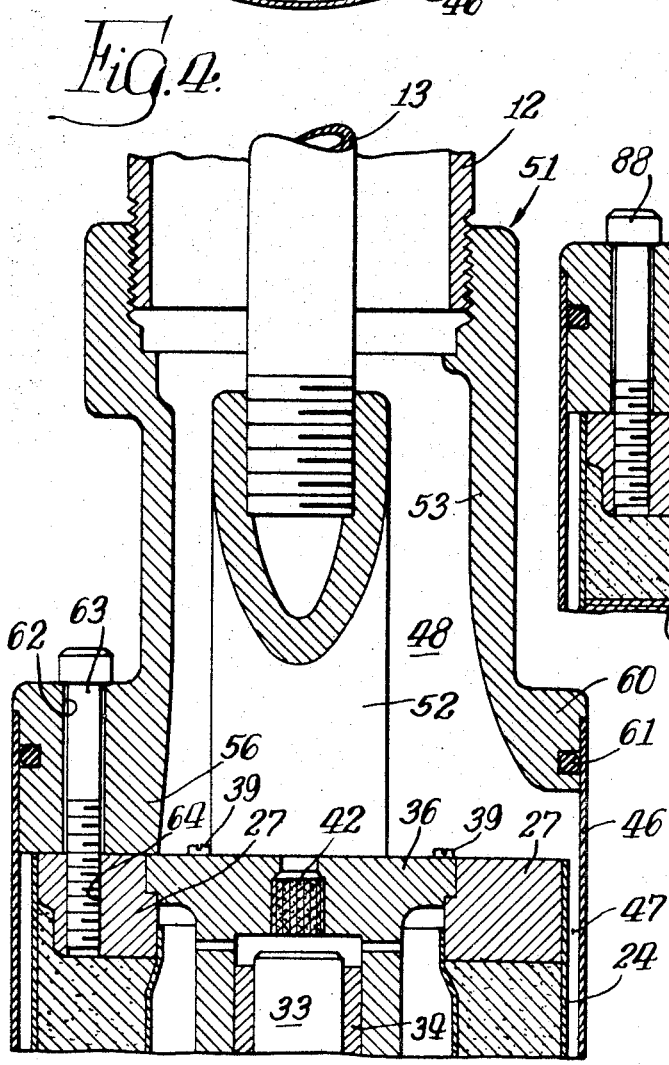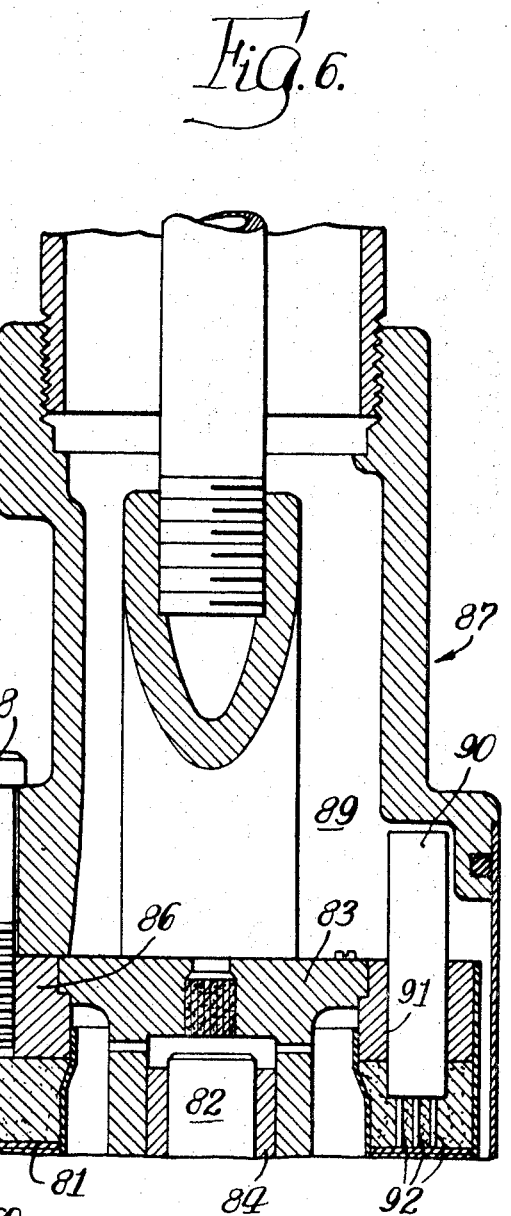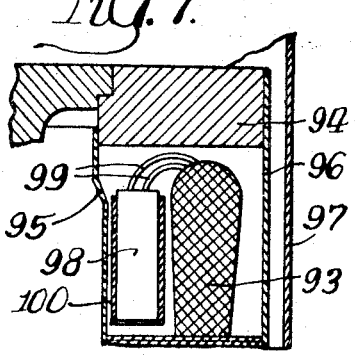

SUBMERSIBLE ELECTRIC MOTOR

A submersible motor of the character disclosed herein is suited for use, for example, in a gasoline dispensing system. In such a system, gasoline is stored in an underground tank and a submersible motor-pump assembly is submerged in the gasoline for pumping the gasoline out of the tank to dispensers as needed. The motor-pump assembly is usually suspended from the lower end of a pipe through which the gasoline flows to the dispensers.

A system including a motor-pump assembly as described above has heretofore been provided, wherein the stator of the motor included an end ring, and two separate members were provided to fasten the end to the pipe. Both members had fluid passages formed therethrough for the liquid being pumped, and the two parts of an electrical connector were secured between the two members on the axis of the motor.

While the foregoing prior art structure works well, it has the disadvantage that the two separate members are relatively expensive to manufacture and assemble. Further, the use of two members and the location of the electrical connector on the axis of the motor results in a motor having a greater length than is desirable for most installations.

In accordance with the present invention these disadvantages are avoided by providing an electric motor for a submersible motor-pump assembly, the motor comprising a stator forming a rotor cavity and including an end ring at the upper end thereof, a rotor positioned in the cavity and rotatably supported by the end ring, a casing positioned around the stator and forming with the stator a liquid conduit, and a single piece connector member, the upper portion of the connector member being adapted to be secured to the pipe and the lower portion of the connector member being releasably fastened to the end ring of the stator, the connector member having fluid passages formed therethrough which connect the conduit with the pipe, and an electrical connector including mating parts secured to the connector member and to the end ring of the stator, the electrical connector being displaced from the axis of the motor and the pipe. Connected in the stator winding circuit is an overload protector which is in close heat transfer relation with both the stator windings and with the liquid being pumped. The protector therefore responds both to overload load conditions and to the absence of liquid being pumped.

Thus, the connector member forms an end section of the motor, makes a mechanical connection between the pipe and the motor for support of the motor-pump assembly, makes a liquid connection between the pipe and the conduit, and makes an electrical connection between the stator windings and an electrical power cable. The connector member may be readily disconnected from the remainder of the motor for servicing or replacement of the motor-pump assembly, the above connections being automatically broken by such a disconnection. Further, the connections are automatically reestablished when the same or a different motor-pump assembly is subsequently attached to the connector member.

Other objects and advantages of the invention will become apparent from the following detailed description taken in conjunction with the accompanying figures of the drawings, in which:

FIG. 1 is an elevational view of an assembly embodying the invention;

FIG. 2 is an enlarged sectional view taken on the line 2-2 of FIG. 1;

FIG. 3 is a sectional view taken on the line 3-3 of FIG. 2;

FIG. 4 is a sectional view taken on the line 4-4 of FIG. 2;

FIG. 5 is a view taken on the line 5-5 of FIG. 3;

FIG. 6 is a view generally similar to FIG. 4 but showing an alternate form of the invention;

FIG. 7 is a fragmentary view showing another alternate form of the invention;

Figure 8:
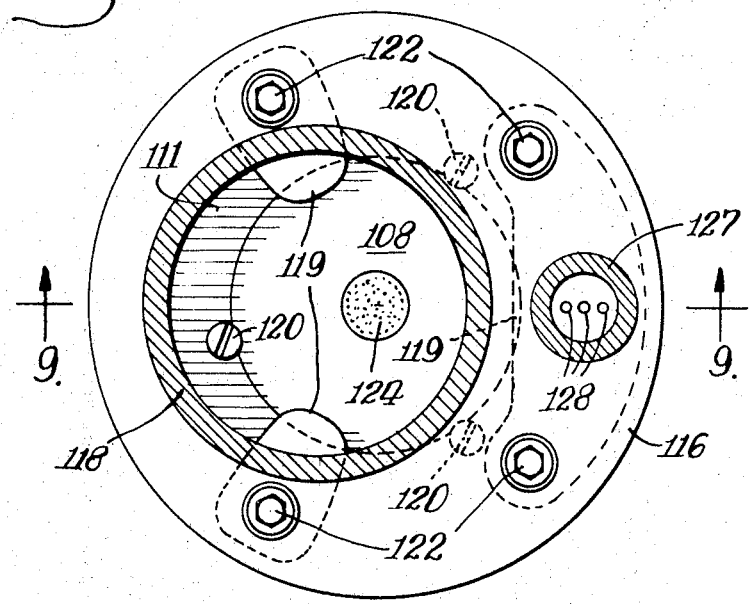
FIG. 8 is a view generally similar to FIG. 2 and showing still another alternate form of the invention.

In greater detail, the assembly shown in FIG. 1 includes an electric motor 10, a pump 11 secured to the lower end of the motor 10 and connected to be driven by the motor, a pipe 12 secured to the upper end of the motor 10, and an electrical conduit 13 mounted within the pipe 12. When the assembly shown in FIG. 1 is used as part of a gasoline dispensing system, the motor-pump assembly is suspended from the lower end of the pipe 12 and is submersed in gasoline in an underground gasoline storage tank. The motor 10 is connected to be energized by a power cable 14 which extends through the electrical conduit 13 from a power supply (not shown) to the motor. When the motor 10 is energized, and drives the pump 11, the gasoline is pumped upwardly through passages formed in the motor 10 to the pipe 12 which conveys it to a header and gasoline dispensers (not shown).

With reference to FIGS. 2 through 5, the electric motor 10 comprises a stator 21 including a stator core 22 and stator windings 23. The stator core 22 and the windings 23 are enclosed in a fluid tight annular enclosure formed by an outer cylindrical shell 24, a cylindrical inner liner 26 which is positioned coaxially within the shell 24, and two end rings 27 (only one end ring being shown in the drawings) located at the opposite ends of the stator. The two end rings 27 are positioned between the liner 26 and the shell 24 and are secured thereto as by welding to form a fluid tight stator enclosure. The stator enclosure contains the stator core and windings, and it is preferably filled with an epoxy potting compound which completely fills the spaces around the stator core and windings.

The motor 10 further includes a rotor 31 mounted coaxially with and within the stator 22. The rotor 31, only the upper end of which is shown in the drawings, comprises a rotor core 32 mounted on a rotor shaft 33, and conventional rotor windings (not shown), the rotor preferably being coated with a material which protects it from the liquid in which the motor is submerged. The opposite ends of the rotor shaft 33 are rotatably supported by sleeve bearings 34, the bearings 34 in turn being supported by a pair of bearing support members 36. A thrust bearing (not shown) is preferably also provided at the lower end of the motor to sustain the weight of the rotor and the thrust of the pump 11. The liquid in which the assembly is submerged circulates within the rotor cavity, and this liquid serves as a lubricant for the bearings and it also acts as a coolant.

To support the bearings 34 in such manner that they are aligned axially of the motor, each bearing support member 36 has a machined flange 37 which is seated in a counterbore 38 machined in the end ring 27, the flanges 37 and the counterbores 38 being coaxial with the axis of the rotor cavity. Screws or clips are preferably provided to hold the flange 37 of the upper bearing support member in the counterbore 38 of the upper end ring 27. In the present instance, a plurality of screws 39 (FIGS. 3 and 4) are threaded into holes formed in the end ring 27 adjacent the counterbore 38, the heads of the screws 39 overlying the flange 37 and thus preventing the upper bearing support member from coming loose from the end ring 27.

The bearing support member 36 at the upper end of the motor has a hole 41 formed therethrough on the axis of the motor. A flame proof breather 42 is fastened within the hole 41, which permits air and liquid to flow therethrough but prevents a spark or flame from traveling upwardly out of the rotor cavity. When the motor-pump assembly is initially submerged in a liquid, the liquid enters the rotor cavity from the lower end thereof and displaces the air in the rotor cavity. The air moves upwardly through the breather 42 which thus prevents an air lock from occurring. Prevention of an air lock is important because it is necessary for the liquid to circulate within the rotor cavity in order to provide bearing lubrication and cooling of the motor.

The motor 10 further includes an outer casing 46 which is positioned coaxially around and radially spaced from the shell 24. The radial space between the shell 24 and the casing 46 forms an annular conduit or passage 47 through which the pumped liquid flows. The lower end of the passage 47 is connected to receive pumped liquid from the pump 11, and the upper end of the passage 47 leads to liquid passages 48 formed in a connector member 51 which connects the motor 10 to the pipe 12.

The connector member 51 comprises inner and outer tubular wall portions 52 and 53 which are integrally and rigidly connected by radially extending ribs or walls 54. The spaces between the wall portions 52 and 53 and the ribs 54 form the fluid passages 48 in the connector member 51, referred to above. At the lower end of the outer wall portion 53 are formed downwardly extending feet or pedestals 56 (FIG. 5) which are seated on the upper surface of the upper end ring 27 in the spaces between the screws 39. The inner sides of the feet 56 preferably extend radially inwardly sufficiently far that they overlie the upper surface of the bearing support member 36 which is substantially flush with the upper surface of the end ring 27. Thus, when the connector member 51 is secured to the end ring 27, the feet 56 assist the screws 39 in holding the flange 37 of the bearing support member 36 seated in the counterbore 38 of the end ring 27. When the connector member 51 is disconnected from the end ring 27, the screws 39 hold the bearing support member 36 in assembled relation with the end ring 27. In the present construction four feet 56 are provided and arcuate spaces 58 (FIG. 5) between the feet 56 connect the passage 47 with the passages 48.

To fasten the connector member 51 to the remainder of the motor, a radially outwardly extending flange 60 is formed on the lower end of the connector member 51. The outer periphery of the flange 60 has a rabbet 59 formed therein, which receives the upper end of the casing 46, and a groove 59a is formed in the rabbet 59. An O-ring 61 is positioned in the groove 59a and compressed between the casing 46 and the flange 60 in order to seal the connection therebetween. With reference to FIGS. 2 and 5, four annularly spaced holes 62 extend through the flange 60 and feet 56, and screws 63 are positioned in the holes 62 and are threaded into tapped holes 64 (FIG. 4) formed in the end ring 27, thus rigidly securing the connector member 51 to the end ring 27.

At its upper end, the interior of the outer wall 53 of the connector member 51 is internally threaded at 66, to receive threads 65 on the lower end of the pipe 12. A longitudinally extending rib 67 is preferably formed on the outer surface of the member 51 so that the member 51 may be more easily gripped while connecting or disconnecting the pipe 12 and the member 51.

The inner wall portion 52 forms a tubular cable passage, and its upper end is substantially coaxial with the outer wall portion 53 but terminates below the upper end of the outer wall portion. From its upper end, the inner wall portion 52 curves downwardly and radially (see I FIG. 3) to one side as at 55 and merges with the outer wall portion 53. At its upper end, a bore 70 in the inner wall portion 52 is also internally threaded at 71 to receive the threaded lower end of the electrical conduit 13 and establish a liquid tight connection between the conduit 13 and the member 51.

To establish an electrical connection between the power lines 14 and the stator windings 23, an electrical connector 72 comprising an upper part 74 and a lower part 75 is provided. The upper part 74 is secured within the lower end of the bore 70 of the tubular inner wall portion 52, and the lower connector part 75 is secured in an opening 73 formed in the upper end ring 27. The lower connector part 75 is electrically connected to the windings 23 of the stator, whereas the upper connector part 74 is electrically connected to the power cable 14 which leads through the electrical conduit 13 to the power supply. An O-ring 76 in a counterbore 76a around the margin of the bore 70 in the connector member 51 is provided to ensure a liquid tight seal around the electrical connector 72.

In a system including a motor-pump assembly embodying the invention, the connector member 51 is permanently attached to both the pipe 12 and the conduit 13, and the upper part 74 of the electrical connector 72 is electrically connected to the cable 14. The remainder of the motor-pump assembly is assembled with the connector member 51 prior to lowering the assembly into the storage tank. The connector member 51 and the remainder of the motor 10 are moved into assembled relation with the upper end of the casing 46 aligned with the rabbet 59 at the lower end of the connector member 51. The electric motor 10 and the connector member 51 are then angularly adjusted to bring the two parts of the electrical connector 72 into alignment, and when such alignment is attained, the motor 10 and the connector member 51 are moved together to seat the feet or pedestals 56 on the end ring 27 and the bearing support 36. Such movement of course automatically makes an electrical connection between the two parts of the electrical connector 72 and also automatically makes a liquid connection between the passages 47 and the passages 48. The screws 63 are then inserted through the holes 62 in the connector flange 60 and are threaded into the holes formed in the end ring 27 to firmly secure the connector member 51 to the end ring. Thereafter, the motor-pump assembly, suspended from the lower end of the pipe 12, may be lowered into the liquid to be pumped from the storage tank. In operation, the liquid is drawn into the pump 11 and forced upwardly through the annular passage 47 between the shell 24 and the casing 46, through the spaces 58 between the feet 56, through the passages 48 formed in the connector member 51, and upwardly through the pipe 12. The power lines 14 are of course protected from the liquid by the conduit 13, the wall portion 52 of the connector member 51, and the seal 76 around the electrical connector 72.

In the event it is necessary to replace or service the electric motor 10 or the pump 11, the pipe 12 and the conduit 13 are pulled upwardly to raise the motor-pump assembly out of the storage tank. The screws 63 are then removed, permitting the connector member 51 to be disconnected from the remainder of the motor 10. With such a disconnection, the liquid connection between the passage 47 and the passage 48, and the electrical connection through the two parts of the connector 72, are automatically broken. The main body of the motor 10 and the pump 11 may then either be serviced or replaced as necessary. In either event, a motor-pump assembly in operating condition is subsequently attached to the connector member 51 in the manner previously described, and the assembly is then in condition to be again lowered into the liquid.

From the foregoing it will be apparent that replacement or servicing of either the motor or the pump may be accomplished relatively easily without the aid of skilled technicians to make separate electrical and fluid connections. Further, the construction shown in FIGS. 1 through 5 is advantageous over prior art constructions in that the connector member 51 forms part of the electric motor and is connected directly to the pipe 12 and the conduit 13. Thus, an end member for the motor, separate from a member connected to the pipe, is not required, thereby enabling the construction of a less expensive and shorter assembly. The location of the electrical connector 72 at a radially offset position relative to the axis of the motor permits a shortening of the connector member 51 and simplifies the problem of sealing the electrical connector 72. The offset location of the electrical connector is further advantageous in that it angularly orients the connector member relative to the stator during assembly. Further advantages of the present construction are that the outer casing is sealed directly with the connector member 51, the breather 42 is located at the center of the bearing support 36 directly over the bearing 34 so that is it is impossible for air to collect around the bearing 34, and the connector member 51 assists in holding the upper bearing support member 36 assembled with the end ring 27. Further, the pipe 12 and the conduit 13 are concentric and are axially aligned with the motor-pump assembly as in previous systems, thus making the present construction interchangeable with previous constructions.

A heat responsive overload protector is preferably provided in the motor to protect against overheating and burning out of the motor. Such an overload protector may be located and constructed such that it responds only to the temperature of the stator windings, but it is preferred that it be constructed and located to respond both to the temperature of the windings and also to the presence or absence of liquid being pumped. To this end, a temperature responsive overload protector is positioned at a location where it will be heated by the motor windings and simultaneously cooled by the liquid. The overload protector is adjusted to trip if its temperature rises above a predetermined value, and such a temperature rise may occur either if the liquid level falls and thus fails to cool the protector even at low loads, or if the windings become overly heated under excessive load conditions even if the liquid level has not fallen.

Such an arrangement is shown in FIG. 6 and comprises a stator 81, a rotor including a rotor shaft 82, a bearing support 83, a sleeve bearing 84 for the shaft 82, the bearing 84 being carried by the bearing support member 83, an upper end ring 86 which forms part of the stator 81 and supports the bearing support member 83, and a connector member 87 which is secured to the end ring 86 by screws 88. The foregoing structure is of course similar to the construction shown in FIGS. 1 through 5.

The motor further includes a generally cylindrical overload protector 90 which is secured as by a press fit in a hole 91 formed in the end ring 86. The connection between the protector 90 and the end ring 86 is of course liquid tight so that liquid cannot enter the stator interior through the hole 91. The protector 90 is a temperature responsive type and is connected in the power circuit of the motor by conductors 92. The protector 90 is elongated and is fastened to the end ring 86 such that its lower end portion extends into the stator cavity adjacent the windings and its upper end portion extends into liquid passages 89 formed in the connector member 87. Thus, the lower end portion of the connector member is heated by the motor windings during operation of the motor and the upper end portion is cooled by the pumped liquid circulating through the passage 89. If, under excessive load conditions, the motor windings reach excessively high temperatures, the protector 90 will be heated more rapidly than it is cooled by the liquid, and consequently it will trip and disconnect the motor windings. The protector 90 further serves as a low liquid level protector because, with an absence of liquid flowing around the upper end portion of the protector 90, the protector will not be cooled and it will therefore rapidly heat up and disconnect the motor windings even under low load conditions.

An overload protector may be located as shown in FIG. 6 where it will be cooled by direct contact with the liquid or it may be located where it is indirectly cooled by the liquid. Indirect cooling may be accomplished by positioning an overload protector adjacent the windings and in close heat exchange relation with either the inner liner or the outer shell. The motor illustrated in FIG. 7 is of the former construction and comprises stator windings 93, an upper end ring 94, an inner liner 95, an outer shell 96, and a casing 97. An overload protector 98 is positioned between the windings 93 and the inner liner 95, and is electrically connected to the windings 93 by a pair of conductors 99. A tube 100, made of a high heat conducting metal such as copper, may be positioned around the protector 98, the tube 100 being in close contact with both the protector 98 and with the inner liner 95.

During operation of the motor shown in FIG. 7, the motor windings 93 heat the protector 98 while the liquid normally filling the rotor cavity cools the liner 95. The liner 95 in turn cools the tube 100 which of course also cools the protector 98. The operation of the motor and the protector shown in FIG. 7 is otherwise similar to the operation of the motor and protector shown in FIG. 6.

As mentioned above the protector could be in contact with the outer shell 97 instead of with the inner liner 95 but the construction shown in FIG. 7 is preferred because the liner 95 is normally much thinner than the shell 97 and, consequently, the protector would react more quickly to the absence of liquid.

Figure 9:
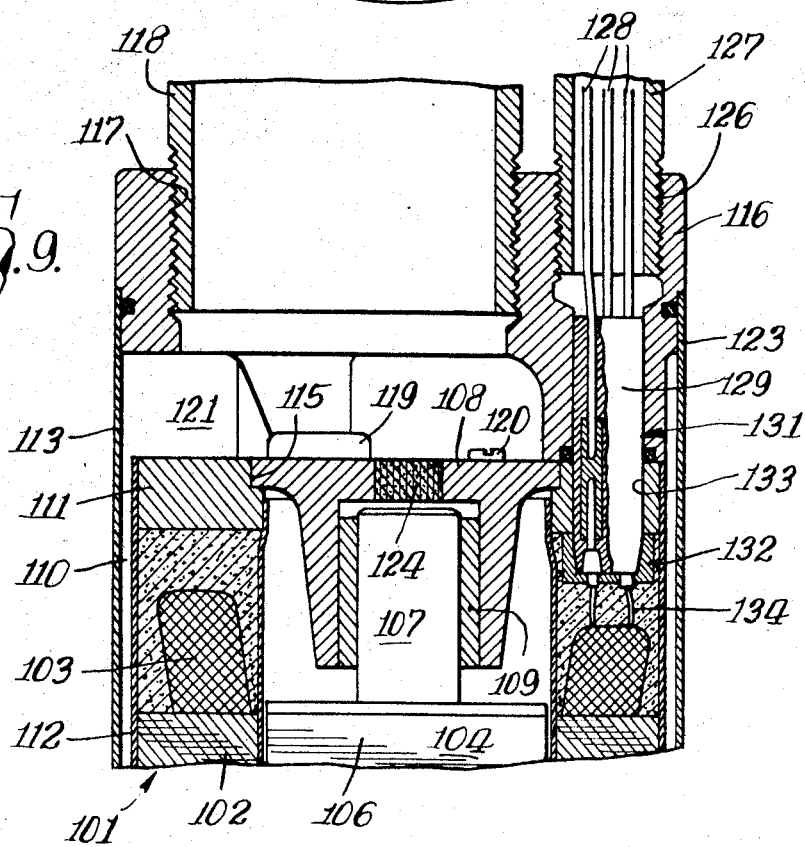
FIG. 9 is a sectional view taken on the line 9-9 of FIG. 8.

The motor construction shown in FIGS. 8 and 9 is generally similar to but shorter than the construction shown in FIGS. 1 through 5. The motor shown in FIGS. 8 and 9 comprises a stator 101 including a core 102, windings 103 and an upper end ring 111, a rotor 104 including a rotor core 106 and a rotor shaft 107, an upper bearing support member 108, and a bearing 109 carried by the bearing support member 108. The end ring 111 has a counterbore 115 formed therein and the outer periphery of the bearing support member 108 is seated in the counterbore 115. The motor further includes an annular fluid passage 110 formed between an outer shell 112 of the motor and an outer casing 113, and during operation of the motor-pump assembly the pumped fluid flows upwardly through this annular passage 110.

The motor further includes a connector member 116 which has an internally threaded opening 117 at its upper end. The opening 117 is threadedly connected to a pipe 118 which supports the motor-pump assembly in a storage tank. At is lower end, the connector member 116 includes downwardly extending feet or pedestals 119 which are seated on the upper surfaces of the end ring 111 and the bearing support member 108. The connector member 116 and a plurality of screws 120 hold the bearing support member 108 assembled with the end ring 111. The spaces 121 between the feet 119 form liquid passages from the passage 110 to the pipe 118. Screws 122 (FIG. 8) are used to firmly secure the connector member 116 to the end ring 111. As in the other forms of the invention, the casing 113 makes a direct connection with the outer periphery of the connector member 116 at 123 when the connector member 116 is assembled with the remainder of the motor. Further, as in the above two embodiments, a breather or flame proof vent 124 is provided directly above the upper end of the rotor shaft 107.

As shown in FIGS. 8 and 9, the opening 117 is radially displaced from the axis of the motor. Radially displaced to one side of both the motor axis and the threaded opening 117, a second opening 126 is formed in the member 116, which receives an electrical conduit 127. Power lines 128 extending through the conduit 127 are connected to the upper part 129 of an electrical connector 131, the part 129 being rigidly secured in the lower end of the opening 126. The lower part 132 of the electrical connector 131 is rigidly secured in an opening 133 formed in the upper end ring 111 and is electrically connected by wires 134 to the windings 103 of the motor. When the connector member 116 and the remainder of the motor are in assembled relation, an electrical connection is made between the two parts of the electrical connector 127 in order to energize the motor windings 103.

The remainder of the motor may be readily disconnected from the connector member 116 for servicing or replacement of either the electric motor or the pump, simply by removing the screws 122 and separating the motor-pump assembly from the connector member 116. Such removal automatically breaks the electrical connection at the connector 132 and the liquid connection between the passages 110 and the pipe 118. Of course after the motor-pump assembly has been serviced or replaced, it may be attached to the connector member 116 simply by moving the parts into assembled relation and securing them together with the screws.

I claim:

1. An electric motor for a submersible motor-pump assembly adapted to be suspended in a liquid from a pipe and to pump the liquid upwardly through the pipe, comprising a stator forming a rotor cavity and including an end ring at the upper end thereof for sealing the upper end of said stator, a rotor rotatably supported in said cavity, a casing positioned around said stator and forming with said stator a liquid conduit around the periphery of said stator, and a connector member, the upper portion of said connector member being adapted to be secured to said pipe and having a liquid passage therein which communicates with said pipe, the lower portion of said connector member being releasably fastened to said end ring of said stator and said liquid passage extending generally radially between the lower end of said lower portion and the upper face of said end ring and communicating with said conduit, whereby liquid flows from said conduit, between said end ring and said lower portion of said connector member, to said pipe.

2. An electric motor as in claim 1, and further including an electric power line extending through said liquid passage in said connector member and adapted to extend through said pipe, an electrical connector for connecting said power line to windings of said motor, and means for insulating said power line and said electrical connector from said liquid.

3. An electric motor as in claim 1, wherein said connector member includes a plurality of spaced feet extending from the lower portion thereof, said feet being secured to said end ring and said passage being formed between said feet.

4. An electric motor as in claim 1, wherein said casing is generally tubular and surrounds said stator, the upper end portion of said casing being sealingly connected to said lower portion of said connector member.

5. An electric motor as in claim 4, wherein said liquid passage extends from said casing generally radially inwardly between said end ring and said lower portion of said connector member and then generally upwardly through said upper portion of said connector member.

6. An electric motor for a submersible motor-pump assembly adapted to be suspended in a liquid from a pipe and to pump the liquid upwardly through the pipe, comprising a stator forming a rotor cavity and including an end ring at the upper end thereof for sealing the upper end of said stator, a rotor rotatably supported in said cavity, a casing positioned around said stator and forming with said stator a liquid conduit around the periphery of said stator, and a connector member, the upper portion of said connector member being adapted to be secured to said pipe and having a liquid passage therein which communicates with said pipe, the lower portion of said connector member being releasable fastened to said end ring of said stator and said liquid passage communicating with said conduit, whereby liquid flows from said conduit, said connector member, to said pipe, said stator including stator windings, and an electrical connector for connecting a power line to said stator windings, said connector comprising an upper part and a lower part, said upper part being secured to said connector member and said lower part being secured to said end ring, said upper and lower parts being sealed from said liquid being pumped when said connector member is fastened to said end ring, connection between said liquid passage and said conduit and connection between said upper and lower parts being automatically made and broken when said connector member is fastened to and released from said end ring.

7. A submersible electric motor for a submersible motor-pump assembly, comprising a stator having a cylindrical rotor cavity formed therein, a rotor positioned in said cavity, said stator including a stator end ring at one end thereof for closing the adjacent end of said stator and for supporting the adjacent end of said rotor for rotative movement within said rotor cavity, a connector member including a portion releasably secured directly to said stator end ring and another portion adapted to be secured to a liquid-carrying pipe, liquid conduit means surrounding said stator, said connector member and said conduit means having interconnected liquid passages, and an electrical connector comprising mating first and second parts, said first part being secured to said connector member and said second part being secured to said stator end ring, said electrical connector being located radially between said pipe and said conduit means and liquid in said liquid passages flowing around at least a portion of said electrical connector, the interconnections between said parts of said electrical connector and between said liquid passages being automatically made and broken when said connector member is secured to and removed from said stator.

8. A motor as in claim 7, wherein said motor further includes a bearing support for the rotor, said support being seated on said end ring, said connector member being secured to said end ring and overlying said bearing support.

9. A motor as in claim 7, wherein said electrical connector is radially displaced from the axis of rotation of said rotor.

10. A submersible electric motor as in claim 7, wherein said end ring has an opening formed therein, and further including a heat responsive overload protector positioned within said opening and secured to said end ring, one portion of said protector extending into said liquid passage in said connector member and another portion of said protector extending into said stator, whereby said protector responds both to the temperature within said stator and to the presence or absence of liquid in said passage.

11. A submersible electric motor for a submersible motor-pump assembly, comprising a stator having a cylindrical rotor cavity formed therein, a rotor positioned in said cavity, said stator including an end ring at one end of said stator for supporting said rotor, a cylindrical casing surrounding said stator in radially spaced relation to said stator, said space providing a liquid passage between said stator and said casing, a connector member comprising a main body portion and a plurality of spaced-apart feet extending from said body portion toward and into engagement with said end ring, a plurality of bolts positioned in holes formed through at least some of said feet and in said end ring for securing said connector member directly to said end ring, said body portion of said connector member having a liquid passage formed therethrough, the spaces between said feet interconnecting said liquid passage around said stator with said liquid passage in said body portion and thus establishing fluid connection therebetween, one of said feet having a hole formed therethrough, and an electrical connector positioned in said hole.

12. A submersible motor as in claim 11, wherein said casing extends beyond the end of said stator around said spaces between said feet, and into sealing engagement with said body portion, said casing thus confining the liquid flowing through said spaces between said feet.

13. A submersible electric motor comprising a tubular stator, a rotor rotatably mounted within said stator, a connector member releasably connected to said stator at one end of said motor, said motor having interconnected liquid passages formed through said stator and said connector member, and an electrical connector including a first part secured to said stator and a second part secured to said connector member, said first and second parts having mating configurations and being automatically engaged and disengaged upon assembly and disassembly of said connector member with said stator, said electrical connector being radially displaced to one side of the axis of rotation of said rotor and thus serving to angularly orientate said connector member relative to said stator, said connector member having a cable passage formed therein adapted to receive an electrical cable, said cable passage leading to said second part of said electrical connector and being sealed from said liquid passage.

14. A motor as in claim 13, wherein said cable passage extends through and is substantially surrounded by said liquid passage in said connector member.

15. A motor as in claim 13, wherein said cable passage is radially displaced to one side of said liquid passage in said connector member.

16. A submersible motor for use submerged in a liquid, comprising a stator forming a rotor cavity, said stator including windings within the interior thereof. a rotor rotatably supported within said rotor cavity, and a thermal overload protector secured to said stator and extending at least partially into the interior of said stator and being in heat exchange relation both with said stator windings and with said liquid, whereby said protector responds both to the temperature of said stator windings and to the presence or absence of said liquid.

17. A motor as in claim 16, wherein said stator includes inner and outer walls which are adapted to be directly contacted by said liquid, and said thermal protector is positioned in said stator closely adjacent said windings and also closely adjacent one of said walls.

18. A motor as in claim 17, wherein said inner wall is made of a relatively thin heat conductive metal, and said protector is positioned in close heat conducting relation with said inner wall.

19. A motor as in claim 17, and further including heat conducting means positioned around and in close contact with said protector.

20. A submersible motor for use submerged in a liquid, comprising a stator forming a rotor cavity and including windings, a rotor rotatably supported within said rotor cavity, and a thermal overload protector secured to said stator in heat exchange relation both with said stator windings and with said liquid, whereby said protector responds both to the temperature of said stator windings and to the presence or absence of said liquid, said protector including an inner portion and an outer portion, said inner portion extending into said stator closely adjacent said stator windings, and said outer portion extending out of said stator and adapted to be directly contacted by said liquid.

21. A submersible motor for use submerged in a liquid, comprising a stator forming a rotor cavity and including windings, a rotor rotatably supported within said rotor cavity, and a thermal overload protector secured to said stator in heat exchange relation both with said stator windings and with said liquid, whereby said protector responds both to the temperature of said stator windings and to the presence or absence of said liquid, said stator including an end ring closing one end of said stator, said end ring having an opening formed therethrough, and said protector being positioned in said opening and extending into said stator to a location adjacent said windings and also extending out of said stator to a location where it is adapted to be in direct contact with said liquid.